March 11, 1924.

1,486,207

C. T. WALLIS

SPEEDMETER OR THE LIKE

Filed Oct. 27, 1921

Inventor
Cyril T. Wallis
by his attorney
Farnum F. Dorsey

Patented Mar. 11, 1924.

1,486,207

UNITED STATES PATENT OFFICE.

CYRIL T. WALLIS, OF ROCHESTER, NEW YORK, ASSIGNOR TO NORTH EAST ELECTRIC COMPANY, OF ROCHESTER, NEW YORK, A CORPORATION OF NEW YORK.

SPEEDMETER OR THE LIKE.

Application filed October 27, 1921. Serial No. 510,782.

*To all whom it may concern:*

Be it known that I, CYRIL T. WALLIS, a subject of the King of Great Britain, residing at Rochester, in the county of Monroe and State of New York, have invented certain new and useful Improvements in Speedmeters or the like; and I do hereby declare the following to be a full, clear, and exact description of the invention, such as will enable others skilled in the art to which it appertains to make and use the same.

This invention relates to speedmeters, or other instruments, of the type in which a rotary indicator, controlled by a spring, is moved, under the influence of magnetic or other means, to indicate whatever the instrument is designed to measure.

One object of the invention is to facilitate the manufacture, adjustment and repair of such an instrument, by mounting the indicator in a separable frame-member which, with the indicator, its bearings, controlling-spring and stop, constitute a unitary assembly, the frame-member being so formed as to permit this assembly to be handled and to be laid upon a bench or tray without injury to the indicator. To this end the indicator is pivoted in a frame-member formed as hereinafter described and claimed.

Another object of the invention is to provide simple and convenient means for retaining the bearings in which the indicator turns, and a stop-device for the indicator having provision for convenient adjustment of the indicator-spring. To this end the instrument is provided with the novel stop-member and bearing-retainer hereinafter described and claimed.

Figure 1:
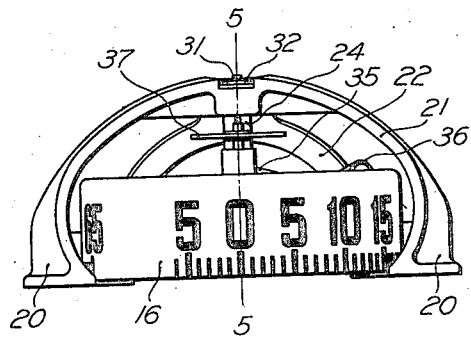
Figure 2:
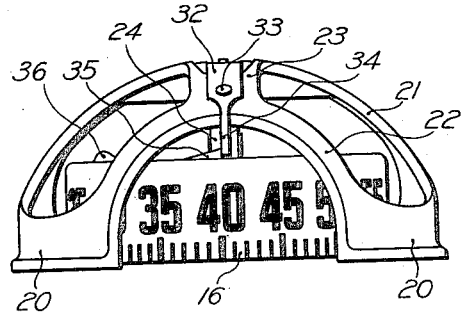
Figure 3:
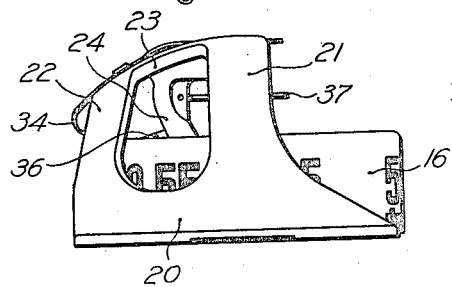
Figure 5:
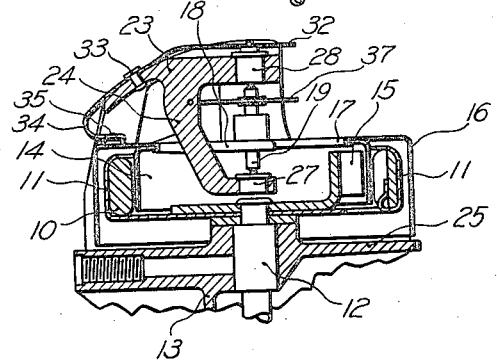
Figure 4:
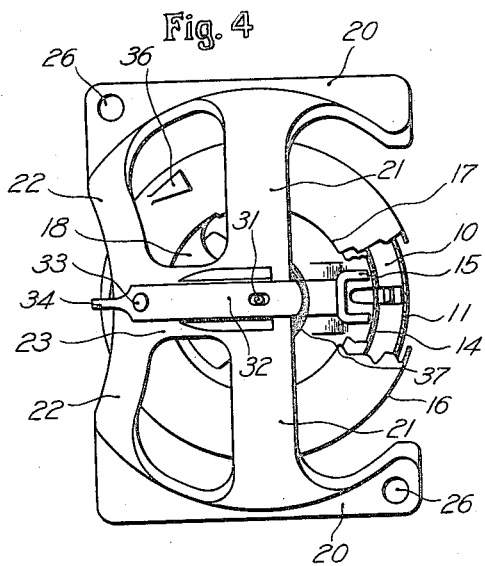
Figure 6:
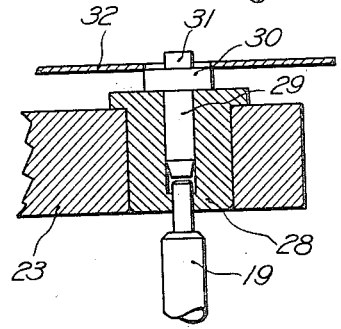

In the accompanying drawings Figs. 1 to 4 are, respectively, a front-elevation, a rear-elevation, a side-elevation and a plan-view, of the assembly comprising the indicator, its frame-member and associated parts, in a speedmeter embodying the present invention. Fig. 5 is a section on the line 5—5 in Fig. 1, including the rotor and a part of the lower frame-member of the instrument; and Fig. 6 is a greatly enlarged sectional view of the upper indicator-bearing and its retaining-device.

The invention is illustrated as embodied in a speedmeter of the magnetic type, in which a ring-shaped magnet 10 is supported and rotated by a cup 11 on the upper end of a drive-shaft 12, this shaft being journalled in bearings in the lower frame-member 13 of the instrument. The indicator comprises an inner wall or skirt 14 of conductive sheet-metal such as aluminum, and this is subjected to electromagnetic torque by the rotating magnet in a well-known manner, the magnetic flux being concentrated in the skirt by an iron armature 15 rotating with the magnet and constantly bridging its poles. The details of the magnetic system have no bearing on the present invention and need not be further described.

The indicator comprises also an outer skirt 16, which may be graduated as required, the significant graduation being brought into view or into alignment with some suitable indicating-device in the usual manner, by the partial rotation of the indicator. The two skirts are shown as joined by seaming the sheet-metal at 17.

The skirts are supported by a radial arm 18 which is fixed to a vertical staff or axis 19.

The bearings in which the axis turns are mounted in a frame-member which comprises two wide base-portions 20, connected by two arch-shaped portions 21 and 22, these latter being, in turn, connected at the middle by a portion 23, these several portions being shown as cast integrally. From the portion 23 of the frame-member an integral arm 24 depends, in position to support the lower bearing of the axis.

The upper frame-member just described rests on a flat surface or table 25 at the top of the lower frame-member 13, and is secured thereon by screws (not shown) through holes 26 in the base portions 20.

The arm 24, and the arch 21 are provided with vertically aligning perforations in which the lower and upper bearings 27 and 28 are seated, both bearings being flanged at their upper ends to support them in their seats. The form and construction of the lower bearing is not involved in the present invention, but it will be understood that this bearing supports the weight of the indicator by a thrust engagement with the lower end of the axis. The upper bearing is shown in detail in Fig. 6. In addition to the body of the bearing, in which the reduced upper end of the axis is journalled, there is a thrust-member or pin 29 which depends loosely in the bore of the bearing and is provided with a head 30 to limit its downward movement. The reduced upper extremity 31 of the thrust-pin engages an opening in the forward end of a flat spring 32 which is pivotally secured to the upper frame member by a rivet 33.

When the parts of the instrument are to be assembled the bearing 27 is put in place and the indicator can then be passed into the frame and the lower end of the axis introduced into the bearing 27. The upper bearing 28 is then put in place, and secured by engagement of the spring with the thrust-pin. The clearance between the latter and the upper end of the axis may then be tested, and if too little the pin can be removed, upon raising and swinging aside the spring 32, and shortened to the required extent by filing its lower end. In this way a nice adjustment can be secured with a minimum of labor and expense. When the spring is in place all of the bearing-members are retained securely in place, without the use of screws or other loose parts.

It is necessary to provide a stop to limit the rotary movement of the indicator in both directions. For this purpose the rear end of the spring 32 is continued beyond the rivet 33 and narrowed to provide a resilient extension 34, which is bent downward and forward into position to cooperate with two stop-lugs 35 and 36 struck up from the metal of the indicator.

An advantage of this form of stop resides in the fact that it can be moved aside in the operation of adjusting the spring 37 by which the indicator is controlled. This spring, which is shown as a hair-spring of ordinary form, returns the indicator to zero position, and to insure this return regardless of friction in the parts it is necessary to adjust the spring so as to have a slight tension when the stop-lug 35 rests against the stop 34, with the indicator at zero position, as shown in the drawings. To ascertain the correct tension the stop may be swung aside, by lifting the forward end of the spring 32 and swinging it on its pivot, so as to permit the indicator to move beyond zero position and completely untension the spring. The amount of zero tension is then indicated by the amount of such movement.

While it is convenient and economical to combine the bearing-retainer and the removable stop in one piece of spring-metal, it will be apparent that the advantages peculiar to each of these members may be secured by making them separate.

It will be apparent from the drawings that when the indicator, spring, bearings and stop-member have been assembled on and in the upper frame-member these parts constitute a self-contained assembly, which may conveniently be handled as a unit apart from the rest of the instrument, and that the frame is so formed as to protect the indicator effectually, as the assembly may be laid upon a bench or tray in any position except the front, without the indicator coming in contact with the supporting surface. At the same time, the spring, the stop and the bearings are all easily accessible for inspection and adjustment.

The invention is not limited to the precise form and arrangement of the various parts hereinbefore described and illustrated in the accompanying drawings, but it may be embodied in various other forms within the scope of the following claims.

The invention claimed is:

1. In a speedmeter or the like, a self-contained assembly comprising: an indicator of generally circular form, provided with an axis on which it turns; a frame-member carrying bearings for said axis and formed to substantially envelope the indicator at the top and sides thereof; and a spring connecting the indicator with the frame-member; the frame-member having widely-spaced lower bearing-surfaces projecting entirely below the indicator, on which the assembly may stand.

2. In a speedmeter or the like, the combination of a lower frame-member; a rotor projecting above and supported by said frame-member; an indicator cooperating with the rotor and provided with an axis on which it turns; and an upper frame-member spanning the indicator and seated on the lower frame-member, the upper frame-member being provided with bearings for both ends of said axis, and the indicator and all parts of the upper frame-member being above the plane of contact between the two frame-members.

3. In a speedmeter or the like, the combination, with a rotary indicator provided with an axis on which it turns, of a frame-member provided with two bearing-receiving openings; bearings seated in said openings and shouldered so as to be removable only in one direction, said bearings receiving the journals of said axis; and a spring retaining device for one of said bearings; the other bearing being retained by a thrust-engagement with the axis.

4. In a speedmeter or the like, the combination of an indicator, of generally circular form, provided with a vertical axis on which it turns; a frame-member, for supporting the indicator formed to overarch the indicator and depend at the sides thereof, below the bottom of the indicator, said frame-member being provided with an arm depending from its upper portion and provided with a bearing for the lower end of the axis of the indicator, and being provided also with a bearing-receiving opening directly above the lower bearing; an upper bearing-member, for said axis, seated in said opening and removable upwardly there-from; and means on the frame-member for normally retaining said bearing-member against upward movement.

5. In a speedmeter or the like, the combination, with a frame and a rotary spring-controlled indicator provided with a stop-projection and journalled in the frame, of a stop-member, cooperative with said stop-projection to arrest the movement of the indicator in zero position, said stop-member comprising a leaf-spring pivoted to the frame and having one extremity normally in position to engage the stop-projection; the other extremity of the spring being manually movable to swing the stop-member away from normal operative position.

6. In a speedmeter or the like, the combination of a rotary indicator provided with an axis on which it turns; a frame-member provided with a bearing-opening; a journal-bearing embracing one journal of said axis and loosely seated in said opening, said bearing being shouldered to engage the frame and prevent movement in one direction; a pin loosely seated in said journal-bearing and acting as a thrust-bearing for said axis, said pin being shouldered to engage the journal-bearing; and a spring attached to the frame-member and normally engaging said pin and acting to press and hold its shouldered portion against the journal-bearing and, through the medium of said pin, to press and hold the shouldered portion of the journal-bearing against said frame-member.

7. In a speedmeter or the like, the combination of a rotary spring-controlled indicator provided with an abutment; a stationary frame-member; a stop arranged to cooperate with said abutment and mounted on said frame-member, said stop being pivoted to the frame-member so that it may be swung out of normal operative position to permit the indicator to move beyond zero position; and a spring detent for retaining the stop normally in operative position.

8. In a speedmeter or the like, the combination, with a rotary spring-controlled indicator provided with an abutment, and a frame-member provided with a removable bearing for the indicator, of a spring-strip pivoted to the frame-member between its ends and formed, at one end, as a stop to cooperate with said abutment on the indicator, the other end of the spring-strip normally overhanging said bearing and retaining it in place; the spring-strip being pivotably movable, when bent away from said bearing, to release the bearing and also to remove the stop from normal operative position so as to permit the indicator to move beyond zero position.

9. In a speedmeter or the like, the combination, with a frame-member and a rotary spring-controlled indicator provided with an abutment and journalled in the frame, of a stop-member cooperative with said abutment to arrest the movement of the indicator in zero position; said stop-member comprising a leaf-spring pivoted to the frame and normally retaining itself, by its resilient action, in operative position, but being pivotably movable out of such position to permit the indicator to move beyond zero position.

CYRIL T. WALLIS.